United States Patent
Zhu

(10) Patent No.: US 11,503,642 B2
(45) Date of Patent: Nov. 15, 2022

(54) METHOD AND DEVICE FOR DETERMINING AN UPLINK-DOWNLINK SWITCHING POINT

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 121 days.

(21) Appl. No.: 17/251,450

(22) PCT Filed: Jun. 15, 2018

(86) PCT No.: PCT/CN2018/091663
§ 371 (c)(1),
(2) Date: Dec. 11, 2020

(87) PCT Pub. No.: WO2019/237360
PCT Pub. Date: Dec. 19, 2019

(65) Prior Publication Data
US 2021/0251010 A1    Aug. 12, 2021

(51) Int. Cl.
*H04W 74/08* (2009.01)
*H04W 72/04* (2009.01)
(Continued)

(52) U.S. Cl.
CPC ... *H04W 74/0825* (2013.01); *H04W 72/0446* (2013.01); *H04W 74/006* (2013.01); *H04W 80/02* (2013.01)

(58) Field of Classification Search
CPC ......... H04W 74/0825; H04W 72/0446; H04W 74/006; H04W 80/02; H04W 72/042;
(Continued)

(56) References Cited

U.S. PATENT DOCUMENTS

2015/0085712 A1\* 3/2015 Wang ............... H04L 1/1848
370/280
2017/0142702 A1    5/2017 Yu et al.
(Continued)

FOREIGN PATENT DOCUMENTS

CN    101431362 A    5/2009
CN    101572590 A    11/2009
(Continued)

OTHER PUBLICATIONS

Examination Report for Indian Application No. 202147000953, dated Jan. 4, 2022, 8 pages.
(Continued)

*Primary Examiner* — Afshawn M Towfighi
(74) *Attorney, Agent, or Firm* — Finnegan, Henderson, Farabow, Garrett & Dunner, L.L.P.

(57) ABSTRACT

The present disclosure provides a method and device for determining an uplink-downlink switching point. The method is used in a base station. The method includes: setting configuration information for determining an uplink-downlink switching point; and sending the configuration information to the terminal, so that the terminal determines the uplink-downlink switching point according to the configuration information. Therefore, the present disclosure can prevent the terminal from performing invalid detection on an unlicensed carrier, and can also improve the speed and accuracy of determining the uplink-downlink switching point by the terminal.

8 Claims, 11 Drawing Sheets

(51) Int. Cl.
*H04W 74/00* (2009.01)
*H04W 80/02* (2009.01)

(58) Field of Classification Search
CPC ............. H04W 72/1289; H04L 5/0032; H04L 5/0082; H04L 5/0092; H04L 5/1438; H04L 5/1469; H04L 5/0053
See application file for complete search history.

(56) References Cited

U.S. PATENT DOCUMENTS

| | | | |
|---|---|---|---|
| 2018/0049175 A1* | 2/2018 | Bagheri | H04L 43/08 |
| 2020/0245357 A1* | 7/2020 | Cui | H04L 5/001 |
| 2020/0252948 A1* | 8/2020 | Cui | H04L 5/0053 |

FOREIGN PATENT DOCUMENTS

| | | |
|---|---|---|
| CN | 101610578 A | 12/2009 |
| CN | 106851839 A | 6/2017 |
| CN | 107889232 A | 4/2018 |
| CN | 110351874 A | 10/2019 |
| WO | WO 2018/031068 A1 | 2/2018 |
| WO | WO 2018/071068 A1 | 4/2018 |

OTHER PUBLICATIONS

ISA State Intellectual Property Office of the People's Republic of China, International Search Report Issued in Application No. PCT/CN2018/091663, dated Feb. 14, 2019, WIPO, 4 pages.
European Patent Office, Extended European Search Report Issued in Application No. 18922197.1, dated Jun. 8, 2021, 9 pages.
State Intellectual Property Office of the People's Republic of China, Office Action and Search Report Issued in Application No. 201880000961.9, dated Apr. 30, 2021, 10 pages.
ISA State Intellectual Property Office of the People's Republic of China, Written Opinion of International Searching Authority Issued in Application No. PCT/CN2018/091663, dated Feb. 14, 2019, WIPO, 11 pages.
Huawei, HiSilicon, "NR frame structure on unlicensed bands", 3GPP TSG RAN WG1 Meeting #93, R1-1805917, Busan, Korea, May 21-25, 2018, 8 pages.
Lenovo, Motorola Mobility, "Frame structure for NR-U operation", 3GPP TSG RAN WG1 Meeting #93, R1-1806345, Busan, Korea, May 21-25, 2018, 3 pages.

* cited by examiner

METHOD AND DEVICE FOR DETERMINING AN UPLINK-DOWNLINK SWITCHING POINT

CROSS REFERENCE TO RELATED APPLICATIONS

This application is a national phase application based on International Application No. PCT/CN2018/091663, filed Jun. 15, 2018, the content of which is incorporated herein by reference.

TECHNICAL FIELD

The present disclosure relates to the field of communication technology, in particular to a method and device for determining an uplink-downlink switching point.

BACKGROUND

The new generation communication system is required to support flexible configuration of multiple service types corresponding to different business needs. For example, eMBB (enhanced Mobile Broad Band) service mainly requires large bandwidth, high speed, etc.; URLLC (Ultra Reliable Low Latency Communication) service mainly requires higher reliability and lower delay; mMTC (massive Machine Type Communication) service mainly requires a large number of connections. However, with the driving of service requirements, only licensed spectrum cannot meet more service requirements in the new generation communication system.

SUMMARY

In order to overcome the problem in the related art, examples of the present disclosure provide a method and device for determining an uplink-downlink switching point.

According to a first aspect of the examples of the present disclosure, there is provided a method for determining an uplink-downlink switching point, where the method is applied to a base station, and includes:

setting configuration information for determining the uplink-downlink switching point; and sending the configuration information to a terminal, so that the terminal determines the uplink-downlink switching point according to the configuration information.

In an example, the configuration information includes location information of at least one uplink-downlink switching point in a maximum channel occupation time (MCOT) and/or time length information of an uplink-downlink switching in the MCOT.

In an example, sending the configuration information to the terminal comprises:

setting transmission unit structural information for indicating the configuration information in an implicit way, wherein the transmission unit structural information is used to indicate uplink and downlink configuration of a transmission unit included in an MCOT; and sending the transmission unit structural information to the terminal, so that the terminal determines the configuration information according to the transmission unit structural information.

In an example, the transmission unit structural information includes transmission direction indication information, wherein the transmission direction indication information is used to indicate a transmission direction of a transmission unit included in an MCOT, and at least includes first state information, and/or second state information, and/or third state information;

In an example, sending the transmission unit structural information to the terminal comprises:

adding the transmission unit structural information to a designated signaling; and sending designated signaling to the terminal, so that the terminal obtains the transmission unit structural information from the designated signaling.

In an example, sending the configuration information to the terminal comprises:

setting a scheduling signaling for indicating the configuration information in an implicit way;

sending the scheduling signaling to the terminal, so that the terminal determines the configuration information according to the scheduling signaling.

In an example, sending the configuration information to the terminal comprises:

setting a designated signaling for indicating the configuration information in an explicit way; and sending the designated signaling to the terminal, so that the terminal determines the configuration information according to the designated signaling.

In an example, sending the configuration information to the terminal comprises:

setting a designated signal for indicating the configuration information in an explicit way; and sending the designated signal to the terminal, so that the terminal determines the configuration information according to the designated signal.

In an example, the method further comprises:

setting a corresponding relationship between at least one designated signal and designated configuration information;

adding a preset rule including the corresponding relationship to a designated signaling;

sending the designated signaling to the terminal, so that the terminal obtains the preset rule including the corresponding relationship from the designated signaling.

In an example, the designated signaling includes at least one of the following:

radio resource control (RRC) signaling; or media access control-control element (MAC-CE) signaling; or physical layer signaling.

According to a second aspect of the examples of the present disclosure, there is provided a method for determining an uplink-downlink switching point, where the method is applied to a terminal, and the method includes:

receiving configuration information sent by the base station for determining the uplink-downlink switching point;

determining the uplink-downlink switching point according to the configuration information.

In an example, the configuration information includes location information of at least one uplink-downlink switching point within a maximum channel occupation time (MCOT) and/or time length information of an uplink-downlink switching in the MCOT.

In an example, receiving the configuration information sent by the base station for determining the uplink-downlink switching point comprises:

receiving transmission unit structural information sent by the base station for indicating the configuration information in an implicit way, wherein the transmission unit structural information is used to indicate uplink and downlink configuration of a transmission unit included in an MCOT;

determining the configuration information according to the transmission unit structural information.

In an example, the transmission unit structural information includes transmission direction indication information, and the transmission direction indication information is used to indicate a transmission direction of a transmission unit included in an MCOT, and at least includes first state information, and/or second state information, and/or third state information; where the first state information is used to indicate that the transmission unit is uplink transmitted, the second state information is used to indicate that the transmission unit is downlink transmitted, and the third status information is used to indicate that the transmission unit is an uplink-downlink switching point;

Determining the uplink-downlink switching point according to the configuration information comprises:

determining the uplink-downlink switching point according to the third state information included in the transmission direction indication information.

In an example, receiving the transmission unit structural information sent by the base station for indicating the configuration information in the implicit way comprises:

receiving a designated signaling sent by the base station, where the designated signaling includes the transmission unit structural information;

obtaining the transmission unit structural information from the designated signaling.

In an example, receiving the configuration information sent by the base station for determining the uplink-downlink switching point comprises:

receiving a scheduling signaling sent by the base station for indicating the configuration information in an implicit way;

determining the configuration information according to the scheduling signaling.

In an example, receiving the configuration information sent by the base station for determining the uplink-downlink switching point comprises:

receiving a designated signaling sent by the base station for indicating the configuration information in an explicit way;

receiving a designated signaling sent by the base station for indicating the configuration information in an explicit way;

In an example, receiving the configuration information sent by the base station for determining the uplink-downlink switching point comprises:

receiving a designated signal sent by the base station for indicating the configuration information in an explicit way;

determining the configuration information according to the designated signal.

In an example, determining the configuration information according to the designated signal comprises:

obtaining a preset rule which includes a corresponding relationship between at least one designated signal and designated configuration information;

determining designated configuration information corresponding to the designated signal sent by the base station according to the corresponding relationship;

determining the designated configuration information as the configuration information which is indicated by the designated signal in an explicit way.

In an example, the designated configuration information is determined as the configuration information which is indicated by the designated signal in an explicit way.

In an example, the designated signaling includes at least one of the following:

radio resource control (RRC) signaling; or media access control-control element (MAC-CE) signaling; or physical layer signaling.

According to a third aspect of the examples of the present disclosure, there is provided a device for determining an uplink-downlink switching point, where the apparatus is used in a base station, and the device includes:

a first setting module configured to set configuration information for instructing a terminal to determine the uplink-downlink switching point; and a first sending module configured to send the configuration information to the terminal, so that the terminal determines the uplink-downlink switching point according to the configuration information.

In an example, the configuration information includes location information of at least one uplink-downlink switching point within a maximum channel occupation time (MCOT) and/or time length information of an uplink-downlink switching in the MCOT.

In an example, the first sending module comprises:

a first setting submodule configured to set transmission unit structural information for indicating the configuration information in an implicit way, wherein the transmission unit structural information is used to indicate uplink and downlink configuration of a transmission unit included in an MCOT; and a first sending submodule configured to send the transmission unit structural information to the terminal, so that the terminal determines the configuration information according to the transmission unit structural information.

In an example, the transmission unit structural information includes transmission direction indication information, wherein the transmission direction indication information is used to indicate a transmission direction of a transmission unit included in an MCOT, and at least includes first state information, and/or second state information, and/or third state information;

wherein the first state information is used to indicate that the transmission unit is uplink transmitted, the second state information is used to indicate that the transmission unit is downlink transmitted, and the third state information is used to indicate that the transmission unit is the uplink-downlink switching point.

In an example, the first sending submodule comprises:

an addition submodule configured to add the transmission unit structural information to a designated signaling;

a second sending submodule configured to send the designated signaling to the terminal, so that the terminal obtains the transmission unit structural information from the designated signaling.

In an example, the first sending module comprises:

a second setting submodule configured to set a scheduling signaling for indicating the configuration information in an implicit way;

a third sending submodule configured to send the scheduling signaling to the terminal, so that the terminal determines the configuration information according to the scheduling signaling.

In an example, the first sending module comprises:

a third setting submodule configured to set a designated signaling for indicating the configuration information in an explicit way; and a fourth sending submodule configured to send the designated signaling to the terminal, so that the terminal determines the configuration information according to the designated signaling.

In an example, the first sending module comprises:

a fourth setting submodule configured to set a designated signal for indicating the configuration information in an explicit way;

a fifth sending submodule configured to send the designated signal to the terminal, so that the terminal determines the configuration information according to the designated signal.

In an example, the device further comprises:

a second setting module configured to set a corresponding relationship between at least one designated signal and designated configuration information;

an addition module configured to add a preset rule including the corresponding relationship to a designated signaling;

a second sending module configured to send the designated signaling to the terminal, so that the terminal obtains the preset rule including the corresponding relationship from the designated signaling.

In an example, the designated signaling includes at least one of the following:

radio resource control (RRC) signaling; or media access control-control element (MAC-CE) signaling; or physical layer signaling.

According to a fourth aspect of the examples of the present disclosure, there is provide a device for determining an uplink-downlink switching point, where the device is used in a terminal, and the device includes:

a receiving module configured to receive configuration information sent by a base station for determining an uplink-downlink switching point;

a determination module configured to determine the uplink-downlink switching point according to the configuration information.

In an example, the configuration information includes location information of at least one uplink-downlink switching point within a maximum channel occupation time (MCOT) and/or time length information of an uplink-downlink switching in the MCOT.

In an example, the receiving module comprises:

a first receiving submodule configured to receive transmission unit structural information sent by the base station for indicating the configuration information in an implicit way, where the transmission unit structural information is used to indicate uplink and downlink configuration of a transmission unit included in an MCOT;

a first determination submodule configured to determine the configuration information according to the transmission unit structural information.

In an example, the transmission unit structural information includes transmission direction indication information, and the transmission direction indication information is used to indicate a transmission direction of a transmission unit included in an MCOT, and at least includes first status information, and/or second status information, and/or third status information; the first status information is used to indicate that the transmission unit is uplink transmitted, and the second status information is used to indicate that the transmission unit is downlink transmitted, and the third status information is used to indicate that the transmission unit is an uplink-downlink switching point;

the determination module includes:

a second determination submodule configured to determine the uplink-downlink switching point according to the third state information included in the transmission direction indication information.

In an example, the first receiving submodule comprises:

a second receiving submodule configured to receive a designated signaling sent by the base station, wherein the designated signaling includes the transmission unit structural information;

a first obtaining submodule configured to obtain the transmission unit structural information from the designated signaling.

In an example, the receiving module comprises:

a third receiving submodule configured to receive a scheduling signaling sent by the base station for indicating the configuration information in an implicit way;

a third determination submodule configured to determine the configuration information according to the scheduling signaling.

In an example, the receiving module comprises:

a fourth receiving submodule configured to receive a designated signaling sent by the base station for indicating the configuration information in an explicit way;

a fourth determination submodule configured to determine the configuration information according to the designated signaling.

In an example, the receiving module comprises:

a fifth receiving submodule configured to receive a designated signal sent by the base station for indicating the configuration information in an explicit way;

a fifth determination submodule configured to determine the configuration information according to the designated signal.

In an example, the fifth determination submodule comprises:

a second obtaining submodule configured to obtain a preset rule which includes a corresponding relationship between at least one designated signal and designated configuration information;

a sixth determination submodule configured to determine designated configuration information corresponding to the designated signal sent by the base station according to the corresponding relationship;

a seventh determination submodule configured to determine the designated configuration information as the configuration information which is indicated by the designated signal in an explicit way.

In an example, the preset rule is specified by a communication protocol, or informed to the terminal by the base station through a designated signaling.

In an example, the designated signaling includes at least one of the following:

radio resource control (RRC) signaling; or media access control-control element (MAC-CE) signaling; or physical layer signaling.

According to a fifth aspect of the examples of the present disclosure, there is provided a non-transitory computer-readable storage medium having a computer program stored thereon, and the computer program is used to execute the method for determining an uplink-downlink switching point provided in the first aspect described above.

According to a sixth aspect of the examples of the present disclosure, there is provided a non-transitory computer-readable storage medium having a computer program stored thereon, and the computer program is used to execute the method for determining an uplink-downlink switching point provided in the second aspect described above.

According to a seventh aspect of the examples of the present disclosure, there is provided a device for determining an uplink-downlink switching point, where the device is used in a base station, and the device includes:

a processor; and a memory for storing processor-executable instructions;

wherein the processor is configured to:

set configuration information for determining the uplink-downlink switching point; and send the configuration information to the terminal, so that the terminal determines the uplink-downlink switching point according to the configuration information.

According to an eighth aspect of the examples of the present disclosure, there is provided a device for determining an uplink-downlink switching point, where the device is used in a base station, and the device includes:

a processor;

a memory for storing processor-executable instructions;

wherein the processor is configured to:

receive configuration information sent by a base station for determining the uplink-downlink switching point;

determine the uplink-downlink switching point according to the configuration information.

The technical solutions provided by the examples of the present disclosure may include the following beneficial effects:

The base station in the examples of the present disclosure can set the configuration information used to determine the uplink-downlink switching point, and send the configuration information to the terminal so that the terminal can know different downlink switching points through the configuration information, thereby avoiding the terminal from performing invalid detection on an unlicensed carrier, and improving the speed and accuracy of determining the uplink-downlink switching point by the terminal.

The terminal in the examples of the present disclosure can receive the configuration information sent by the base station for determining the uplink-downlink switching point, and determine the uplink-downlink switching point according to the configuration information, thereby avoiding invalid detection of the terminal on an unlicensed carrier, and improving the speed and accuracy of determining the uplink-downlink switching point by the terminal.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show examples in accordance with the present disclosure, and together with the specification are used to explain the principle of the present disclosure.

DETAILED DESCRIPTION OF THE EMBODIMENTS

Exemplary embodiments will be described in detail here, and examples thereof are shown in the accompanying drawings. When the following description refers to the drawings, unless otherwise indicated, the same numbers in different drawings indicate the same or similar elements. The implementation manners described in the following examples do not represent all implementation manners consistent with the present disclosure. Rather, they are merely examples of devices and methods consistent with some aspects of the present disclosure as detailed in the appended claims.

Exemplary embodiments will be described in detail here, and examples thereof are shown in the accompanying drawings. When the following description refers to the drawings, unless otherwise indicated, the same numbers in different drawings indicate the same or similar elements. The implementation manners described in the following examples do not represent all implementation manners consistent with the present disclosure. Rather, they are merely examples of devices and methods consistent with some aspects of the present disclosure as detailed in the appended claims.

The terms used in the present disclosure are only for the purpose of describing specific embodiments, and are not intended to limit the present disclosure. The singular forms "a", "said" and "the" used in the present disclosure and appended claims are also intended to include plural forms, unless the context clearly indicates other meanings. It should also be understood that the term "and/or" used herein refers to and includes any or all possible combinations of one or more associated listed items.

It should be understood that although the terms "first", "second", "third", etc. may be used in this disclosure to describe various information, the information should not be limited to these terms. These terms are only used to distinguish the same type of information from each other. For example, without departing from the scope of the present disclosure, the instruction information may also be referred to as second information, and similarly, the second information may also be referred to as instruction information. Depending on the context, the word "if" as used herein can be interpreted as "when" or "when" or "in response to determination".

Figure 1:
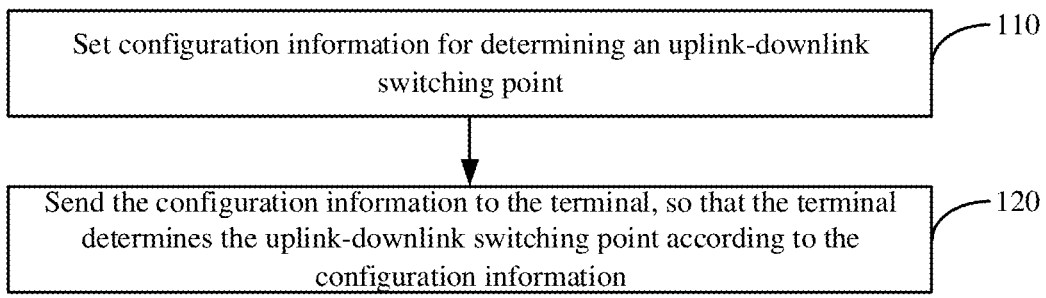
FIG. 1 is a flowchart showing a method for determining an uplink-downlink switching point according to an example.
Figure 2:
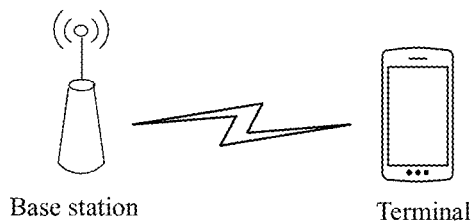
FIG. 2 is an application scenario diagram of a method for determining an uplink-downlink switching point according to an example.

FIG. 1 is a flowchart of a method for determining an uplink-downlink switching point according to an example, and FIG. 2 is an application scenario diagram of a method for determining an uplink-downlink switching point according to an example; the method for determining the uplink-downlink switching point may be used in the base station; as shown in FIG. 1, the method for determining the uplink-downlink switching point may include the following steps 110-120.

In step 110, configuration information for determining an uplink-downlink switching point is set.

In an example of the present disclosure, a mechanism of LBT (Listen Before Talk) is introduced for unlicensed spectrum. That is to say, when there is data to be sent, a data sending end needs to first detect whether a channel is in an idle state, and sends the data only when the channel is in an idle state. The time during which the channel can be occupied by the data sending end is limited by MCOT (Maximum Channel Occupancy Time). That is to say, if the data sending end completes a channel detection process and successfully acquires a channel, the maximum occupation time for the channel cannot exceed the time defined by MCOT.

When a base station serves as the data sending end, the base station may send data to the terminal after completing the LBT channel detection and successfully acquiring the channel, and the terminal needs to send HARQ (Hybrid Automatic Repeat reQuest) feedback information for the data on a corresponding location.

Because some services have higher time-delay requirements, the terminal is required to perform HARQ feedback within the MCOT. However, there may be multiple uplink-downlink switching points in an MCOT. In this case, the base station can set configuration information for determining the uplink-downlink switching point, and then send the configuration information to the terminal, so that the terminal can determine the uplink-downlink switching point according to the configuration information. In such a way, the service requirements with the higher time-delay condition can be satisfied better. In addition, after the terminal has obtained the configuration information for the uplink-downlink switching point, it can also flexibly adjust the LBT mechanism based on its own needs, for example, adjusting the LBT mechanism according to the difference of a signal or signaling to be transmitted, in order to ensure the transmission performance of the signal or signaling.

In an example, the configuration information may include location information of at least one uplink-downlink switching point in an MCOT and/or time length information of an uplink-downlink switching in the MCOT.

In step 120, the configuration information is sent to the terminal, so that the terminal determines the uplink-downlink switching point according to the configuration information.

In an example of the present disclosure, the base station sends the configuration information to the terminal, in order to allow the terminal to determine the uplink-downlink switching point according to the configuration information. As for how to send the configuration information to the terminal, there are many implementations including but not limited to the following two implementations.

Method 1: The configuration information is indicated by the base station in an implicit way, and then determined by the terminal based on the implicit indication.

Figure 3:
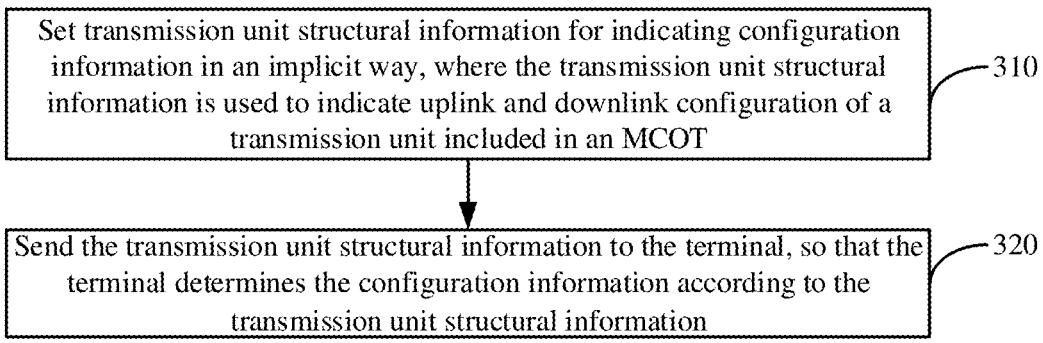
FIG. 3 is a flowchart showing another method for determining an uplink-downlink switching point according to an example.

For example, information for indicating the configuration information in an implicit way is transmission unit structural information, and the specific implementation can refer to the example shown in FIG. 3. For another example, the information for indicating the configuration information in an implicit way is scheduling signaling, and the specific implementation can refer to the example shown in FIG. 4.

Method 2: The configuration information is indicated by the base station in an explicit way, and then determined by the terminal based on the explicit indication.

Figure 5:
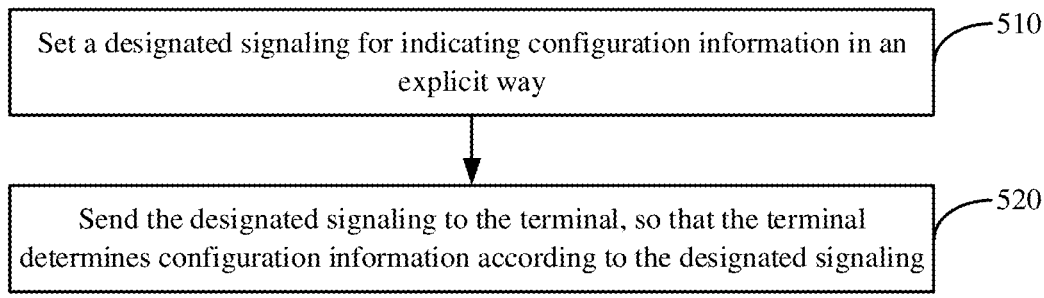
FIG. 5 is a flowchart showing another method for determining an uplink-downlink switching point according to an example.

For example, information for indicating the configuration information in an explicit way is designated signaling, and the specific implementation refers to the example shown in FIG. 5. For another example, the information for indicating the configuration information in an explicit way is a designated signal, and the specific implementation refers to the example shown in FIG. 6.

In an example scenario, as shown in FIG. 2, a base station and a terminal are included. In order to facilitate the terminal to learn about different uplink-downlink switching points in time and accurately, the base station can first set configuration information for determining an uplink-downlink switching point, and then send the configuration information to the terminal, so that the terminal can learn about the different uplink-downlink switching points through the configuration information.

It can be seen from the above example that, by setting the configuration information for determining the uplink-downlink switching point, and sending the configuration information to the terminal, the terminal can learn about different uplink-downlink switching points through the configuration information, thereby avoiding the terminal from performing invalid detection on an unlicensed carrier, and improving the speed and accuracy of determining the uplink-downlink switching point by the terminal.

FIG. 3 is a flowchart of another method for determining an uplink-downlink switching point according to an example. The method for determining an uplink-downlink switching point may be used in a base station; this method is established based on the method shown in FIG. 1, and when the step 120 is performed, as shown in FIG. 3, the step 120 may include the following steps 310-320.

In step 310, transmission unit structural information for indicating configuration information in an implicit way is set, where the transmission unit structural information is used to indicate uplink and downlink configuration of a transmission unit included in an MCOT.

In an example of the present disclosure, the base station can indicate, to the terminal in an implicit way, its configuration information for determining the uplink-downlink switching point through the transmission unit structural information. Thus, the terminal can obtain the configuration information set by the base station for determining the uplink-downlink switching point from the transmission unit structural information in an implicit way, and determine the uplink-downlink switching point according to the obtained configuration information.

In an example, the transmission unit structural information may be transmission direction indication information. The transmission direction indication information is used to indicate the transmission direction of a transmission unit included in an MCOT, and includes at least first status information, and/or second state information and/or third state information; the first state information is used to indicate that the transmission unit is uplink transmitted, the second state information is used to indicate that the transmission unit is downlink transmitted, and the third state information is used to indicate that the transmission unit is used as an uplink-downlink switching point.

Figure 3A:
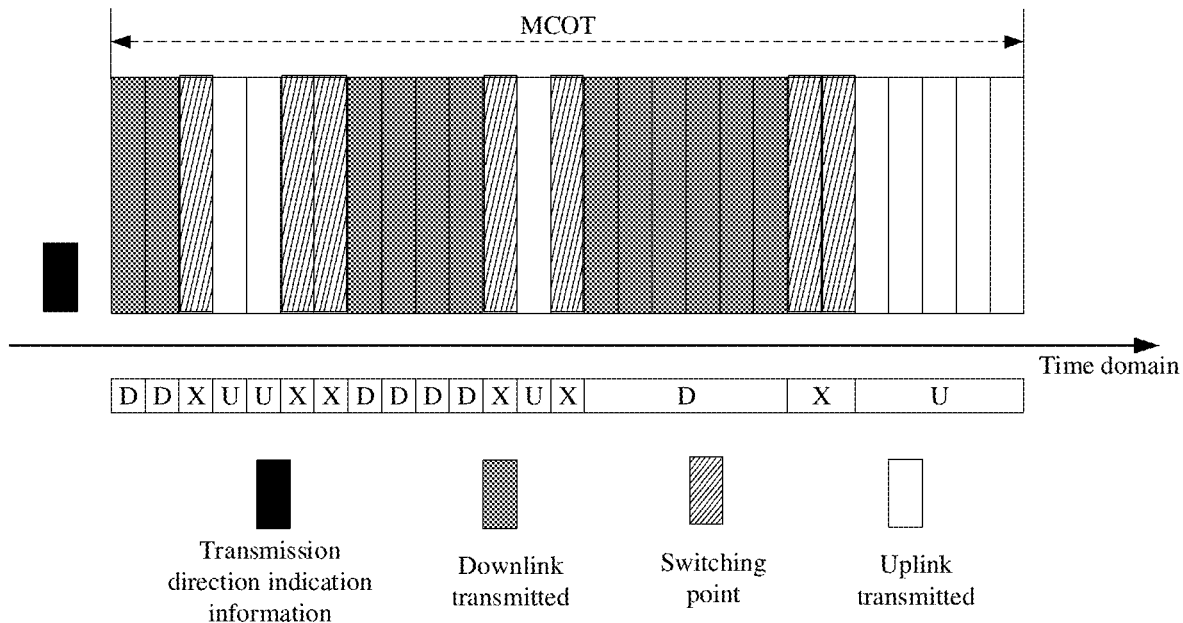
FIG. 3A is a schematic diagram showing transmission direction indication information for indicating configuration information in an implicit way according to an example.

For example, as shown in FIG. 3A, the first status information is U, which is used to indicate that the transmission unit is uplink transmitted; the second status information is D, which is used to indicate that the transmission unit is downlink transmitted; and the third state information is X, which is used to indicate that the transmission unit is used as an uplink-downlink switching point. Correspondingly, after receiving the transmission direction indication information, the terminal can directly determine the uplink-downlink switching point and the length information of the switching point according to the third status information (i.e., X).

In step 320, the transmission unit structural information is sent to the terminal, so that the terminal determines the configuration information according to the transmission unit structural information.

In an example of the present disclosure, the base station sends the transmission unit structural information to the terminal, in order to allow the terminal to obtain the configuration information in an implicit way according to the transmission unit structural information.

In an example, in order to improve the reliability of information transmission, the transmission unit structural information may also be sent to the terminal through designated signaling. The specific implementation process is:

(1-1) Add the transmission unit structural information to the designated signaling;

(1-2) Send the designated signaling to the terminal, so that the terminal obtains the transmission unit structural information from the designated signaling.

In an example, the designated signaling used by the base station to send the transmission unit structural information may include at least one of the following: RRC (Radio Resource Control) signaling; or MAC-CE (Media Access Control-Control Element) signaling; or physical layer signaling.

It can be seen from the above example that, by setting the transmission unit structural information for indicating the configuration information in an implicit way, and sending the transmission unit structural information to the terminal, the terminal can determine the configuration information according to the transmission unit structural information, thereby realizing the function of indicating the configuration information through the transmission unit structural information in an implicit way, enriching the implementations of transmitting the configuration information, and improving the reliability of transmitting the configuration information.

Figure 4:
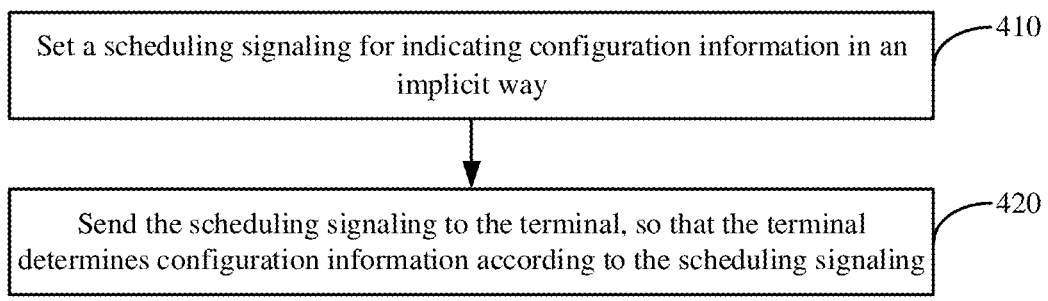
FIG. 4 is a flowchart showing another method for determining an uplink-downlink switching point according to an example.

FIG. 4 is a flowchart of another method for determining an uplink-downlink switching point according to an example. The method for determining an uplink-downlink switching point can be used in a base station; this method is established based on the method shown in FIG. 1, and when step 120 is performed, as shown in FIG. 4, the step 120 may include the following steps 410-420.

In step 410, a scheduling signaling for indicating configuration information in an implicit way is set.

In the example of the present disclosure, the base station can indicate, to the terminal in an implicit way, its configuration information for determining the uplink-downlink switching point through scheduling signaling. Thus, the terminal can obtain in an implicit way the configuration information set by the base station for determining the uplink-downlink switching point from the scheduling signaling, and determine the uplink-downlink switching point according to the obtained configuration information.

Figure 4A:
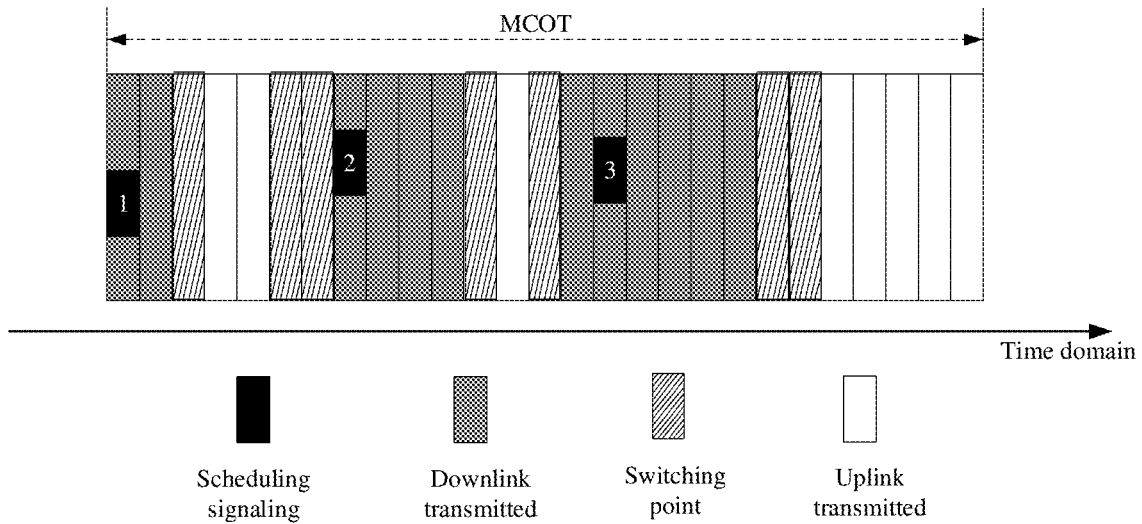
FIG. 4A is a schematic diagram showing a scheduling signaling for indicating configuration information in an implicit way according to an example.

For example, as shown in FIG. 4A, the scheduling signaling 1 set by the base station indicates that the uplink transmission in the MCOT starts from the fourth transmission unit, which indicates the third transmission unit being used for uplink-downlink switching in an implicit way, according to a predefined rule such as specifying a transmitting unit immediately before the starting uplink transmission unit to be used for uplink-downlink switching. Correspondingly, the scheduling signaling 1 received by the terminal indicates that the uplink transmission in the MCOT starts from the fourth transmission unit. Based on the predefined rule, the terminal can learn that the third transmission unit is used for uplink-downlink switching in an implicit way.

In step 420, the scheduling signaling is sent to the terminal, so that the terminal determines configuration information according to the scheduling signaling.

It can be seen from the above example that, by setting a scheduling signaling for indicating configuration information in an implicit way and sending the scheduling signaling to the terminal, the terminal can determine the configuration information according to the scheduling signaling, thereby achieving the function of indicating the configuration information through the scheduling signaling in an implicit way, enriching the implementations of transmitting the configuration information, and improving the reliability of transmitting the configuration information.

FIG. 5 is a flowchart of another method for determining an uplink-downlink switching point according to an example. The method for determining an uplink-downlink switching point may be used in a base station; the method is established based on the method shown in FIG. 1, and when step 120 is performed, as shown in FIG. 5, the step 120 may include the following steps 510-520.

In step 510, a designated signaling for indicating configuration information in an explicit way is set.

In an example of the present disclosure, the base station can indicate, to the terminal in an explicit way, the configuration information set by the base station for determining the uplink-downlink switching point through a designated signaling. Thus, the terminal can directly obtain the configuration information set by the base station for determining the uplink-downlink switching point from the designated signaling in an explicit way, and determine the uplink-downlink switching point according to the obtained configuration information.

The configuration information indicated in an explicit way may include location information of at least one uplink-downlink switching point in an MCOT and/or time length information of uplink-downlink switching in the MCOT; it may also include information such as the number of uplink-downlink switching points and an offset value of each switching point relative to a certain reference point; it may also include the time length of each uplink-downlink switching point.

In an example, the designated signaling used by the base station to indicate the configuration information in an explicit way may include at least one of the following: RRC signaling; or MAC-CE signaling; or physical layer signaling.

In step 520, the designated signaling is sent to the terminal, so that the terminal determines configuration information according to the designated signaling.

It can be seen from the above example that, by setting the designated signaling used to indicate the configuration information in an explicit way, and sending the designated signaling to the terminal, the terminal can determine the configuration information according to the designated signaling, thereby realizing the function of indicating the configuration information through the designated signaling in an explicit way, enriching the implementations of transmitting the configuration information, and improving the reliability of transmitting the configuration information.

Figure 6:
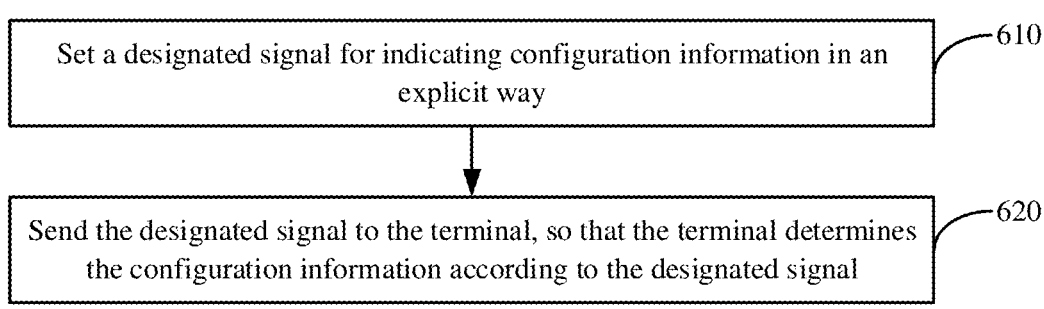
FIG. 6 is a flowchart showing another method for determining an uplink-downlink switching point according to an example.

FIG. 6 is a flowchart showing another method for determining an uplink-downlink switching point according to an example. The method for determining an uplink-downlink switching point may be used in a base station; the method is established based on the method shown in FIG. 1, and when step 120 is performed, as shown in FIG. 6, the step 120 may include the following steps 610-620.

In step 610, a designated signal for indicating configuration information in an explicit way is set.

In an example of the present disclosure, the base station can indicate, to the terminal in an explicit way, its configuration information for determining the uplink-downlink switching point through a designated signal. Thus, the terminal can directly obtain in an explicit way the configuration information set by the base station for determining the upper-lower switching point from the designated signal, and determine the uplink-downlink switching point according to the obtained configuration information.

In step 620, the designated signal is sent to the terminal, so that the terminal determines the configuration information according to the designated signal.

In an example of the present disclosure, the base station sends the designated signal to the terminal, in order to allow the terminal to determine configuration information according to the designated signal. As for how to determine the configuration information according to the designated signal, in an example, the base station may define a rule and notify the terminal of the rule. The specific implementation process can include:

(2-1) Set a corresponding relationship between at least one designated signal and designated configuration information, where the corresponding relationship can be set independently by the base station, or set by the base station according to the provisions of the communication protocol;

(2-2) Add a preset rule including the corresponding relationship to a designated signal;

(2-3) Send the designated signal to the terminal, so that the terminal obtains the preset rule including the corresponding relationship from the designated signal.

In an example, the designated signaling used by the base station to transmit the preset rule may include at least one of the following: RRC signaling; or MAC-CE signaling; or physical layer signaling.

It can be seen from the above example that, by setting the designated signal for indicating the configuration information in an explicit way, and sending the designated signal to the terminal, the terminal can determine the configuration information according to the designated signal, thereby realizing the function of indicating the configuration information through the designated signal in an explicit way, enriching the implementations of transmitting the configuration information, and improving the reliability of transmitting the configuration information.

Figure 7:
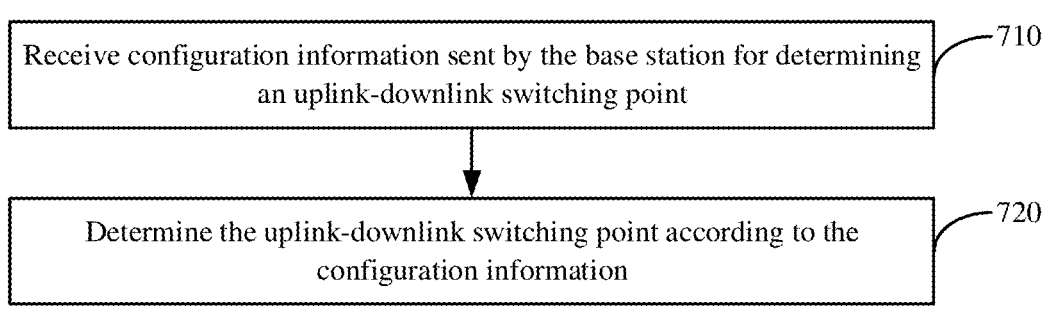
FIG. 7 is a flowchart showing a method for determining an uplink-downlink switching point according to an example.

FIG. 7 is a flowchart of a method for determining an uplink-downlink switching point according to an example. The method for determining an uplink-downlink switching point may be used for a terminal; as shown in FIG. 7, the method for determining an uplink-downlink switching point may include the following steps 710-720.

In step 710, configuration information sent by the base station for determining an uplink-downlink switching point is received.

In an example of the present disclosure, since there may be multiple uplink-downlink switching points in an MCOT, the terminal may determine these uplink-downlink switching points by the configuration information sent by the base station.

As for which way the terminal uses to receive the configuration information, it is determined by the base station. For example, the base station indicates the configuration information in an implicit way, and the terminal also determines the configuration information based on the implicit indication. For another example, the base station indicates the configuration information in an explicit way, and the terminal also determines the configuration information based on the explicit indication.

In an example, the configuration information may include location information of at least one uplink-downlink switching point in an MCOT and/or time length information of uplink-downlink switching in the MCOT.

In step 720, the uplink-downlink switching point is determined according to the configuration information.

It can be seen from the above example that, by receiving the configuration information sent by the base station for determining the uplink-downlink switching point, and determines the uplink-downlink switching point according to the configuration information, invalid detection of the terminal on the unlicensed carrier can be avoided, and the speed and accuracy of determining the uplink-downlink switching point by the terminal can be improved.

Figure 8:
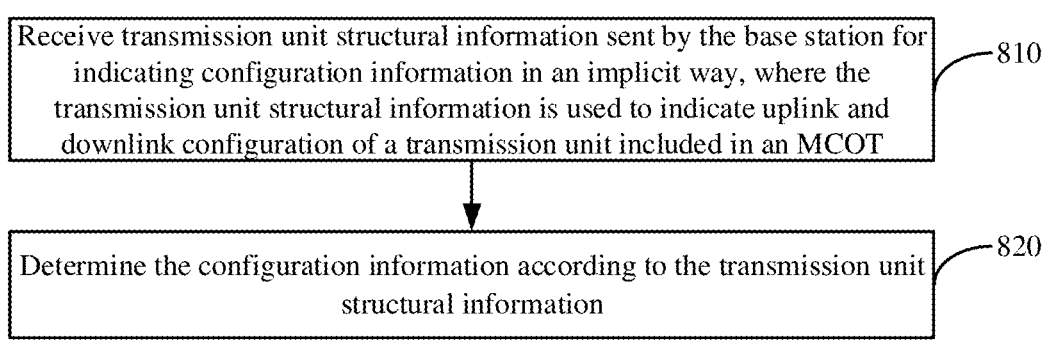
FIG. 8 is a flowchart showing another method for determining an uplink-downlink switching point according to an example.

FIG. 8 is a flowchart of another method for determining an uplink-downlink switching point according to an example. The method for determining an uplink-downlink switching point may be used for a terminal; the method is established based on the method shown in FIG. 7, and when step 710 is performed, as shown in FIG. 8, the step 710 may include the following steps 810-820.

In step 810, transmission unit structural information sent by the base station for indicating configuration information in an implicit way is received, where the transmission unit structural information is used to indicate uplink and downlink configuration of a transmission unit included in an MCOT.

In an example of the present disclosure, the terminal can obtain in an implicit way the configuration information set by the base station for determining the uplink-downlink switching point from the transmission unit structural information, and can determine the uplink-downlink switching point according to the obtained configuration information.

In step 820, the configuration information is determined according to the transmission unit structural information.

In an example, the transmission unit structural information is transmission direction indication information, where the transmission direction indication information is used to indicate the transmission direction of a transmission unit included in an MCOT, and includes at least first status information and/or second state information, and/or third state information; the first state information is used to indicate that the transmission unit is uplink transmitted, the second state information is used to indicate that the transmission unit is downlink transmitted, and the third state information is used to indicate that the transmission unit is used as an uplink-downlink switching point; correspondingly, when step 720 is performed, the uplink-downlink switching point may be determined according to the third state information included in the transmission direction indication information.

For example, as shown in FIG. 3A, the first status information is U, which is used to indicate that the transmission unit is uplink transmitted; the second status information is D, which is used to indicate that the transmission unit is downlink transmitted; the third status information is X, which is used to indicate that the transmission unit is used as an uplink-downlink switching point. Correspondingly, after receiving the transmission direction indication information, the terminal can directly determine the uplink-downlink switching point and the length information of the switching point according to the third status information (i.e., X).

In addition, based on the transmission unit structural information, the terminal can also determine time length information of the uplink-downlink switching based on a certain rule. The rule may be pre-defined, or may be notified to the terminal by the base station through RRC signaling, MAC CE signaling, or physical layer signaling.

It can be seen from the above example that, the transmission unit structural information sent by the base station for indicating the configuration information in an implicit way can be received, where the transmission unit structural information is used to indicate the uplink and downlink configuration of the transmission unit in an MCOT, and the configuration information can be determined according to the transmission unit structural information. In such a way, the function of obtaining the configuration information through the transmission unit structural information in an implicit way can be achieved, and the reliability of determining the uplink-downlink switching point by the terminal can be improved.

Figure 9:
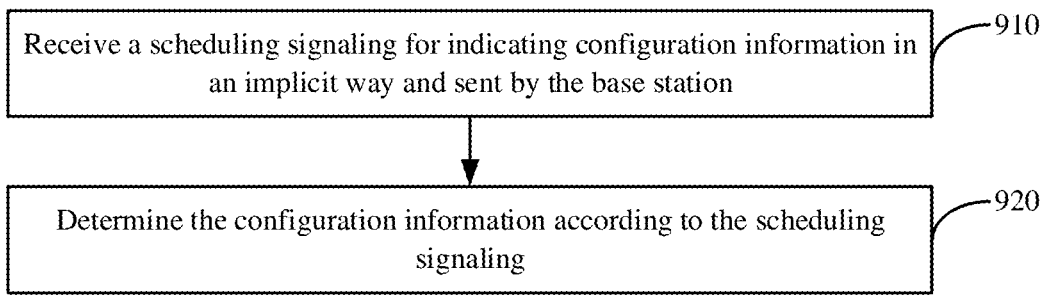
FIG. 9 is a flowchart showing another method for determining an uplink-downlink switching point according to an example.

FIG. 9 is a flowchart of another method for determining an uplink-downlink switching point according to an example. The method for determining an uplink-downlink switching point may be used for a terminal; the method is established based on the method shown in FIG. 7, and when step 710 is performed, as shown in FIG. 9, the step 710 may include the following steps 910-920.

In step 910, a scheduling signaling for indicating configuration information in an implicit way and sent by the base station may be received.

In an example of the present disclosure, the terminal can obtain in an implicit way the configuration information set by the base station for determining the uplink-downlink switching point from the scheduling signaling, and can determine the uplink-downlink switching point according to the obtained configuration information.

In step 920, the configuration information is determined according to the scheduling signaling.

For example, as shown in FIG. 4A, the scheduling signaling 1 set by the base station indicates that the uplink transmission in the MCOT starts from the fourth transmission unit, which indicates the third transmission unit being used for uplink-downlink switching in an implicit way, according to a predefined rule such as specifying a transmitting unit immediately before the starting uplink transmission unit to be used for uplink-downlink switching. Correspondingly, the scheduling signaling 1 received by the terminal indicates that the uplink transmission in the MCOT starts from the fourth transmission unit. Based on the predefined rule, the terminal can learn that the third transmission unit is used for uplink-downlink switching in an implicit way.

It can be seen from the above example that, by receiving the scheduling signaling sent by the base station for indicating the configuration information in an implicit way, and determining the configuration information according to the scheduling signaling, the function of obtaining configuration information through the scheduling signaling in an implicit way can be achieved, and the reliability of determining the uplink-downlink switching points by the terminal can be improved.

Figure 10:
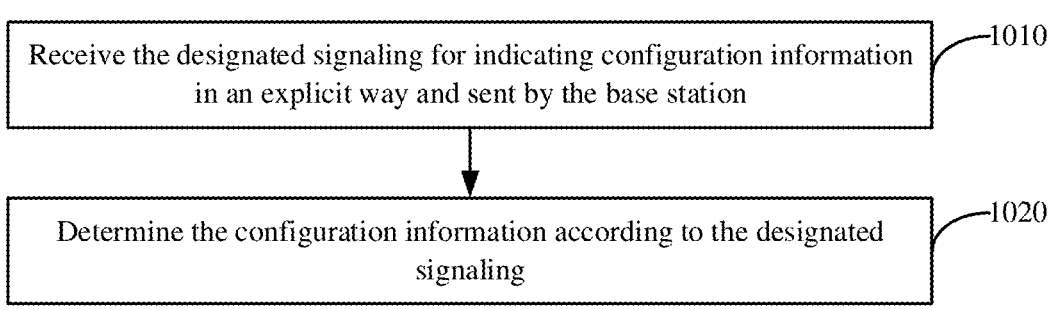
FIG. 10 is a flowchart showing another method for determining an uplink-downlink switching point according to an example.

FIG. 10 is a flowchart of another method for determining an uplink-downlink switching point according to an example. The method for determining an uplink-downlink switching point may be used for a terminal; this method is established based on the method shown in FIG. 7, and when step 710 is performed, as shown in FIG. 10, the step 710 may include the following steps 1010-1020.

In step 1010, the designated signaling for indicating configuration information in an explicit way and sent by the base station is received.

In an example of the present disclosure, the terminal may obtain in an implicit way the configuration information set by the base station for determining the uplink-downlink switching point directly from the designated signaling, and can determine the uplink-downlink switching point according to the obtained configuration information.

The configuration information indicated in an explicit way may include the location information of at least one uplink-downlink switching point in an MCOT and/or the time length information of the uplink-downlink switching in the MCOT; it may also include information such as the number of uplink-downlink switching points and an offset value of each switching point relative to a certain reference point; it can also include the time length of each uplink-downlink switching point.

In an example, the designated signaling received by the terminal for indicating the configuration information in an explicit way may include at least one of the following: RRC signaling; or MAC-CE signaling; or physical layer signaling.

In step 1020, the configuration information is determined according to the designated signaling.

It can be seen from the above example that, by receiving the designated signaling sent by the base station for indicating the configuration information in an explicit way, and determining the configuration information according to the designated signaling, the function of obtaining the configuration information through the designated signaling in an explicit way can be achieved, and the reliability of determining the uplink-downlink switching point by the terminal can be improved.

Figure 11:
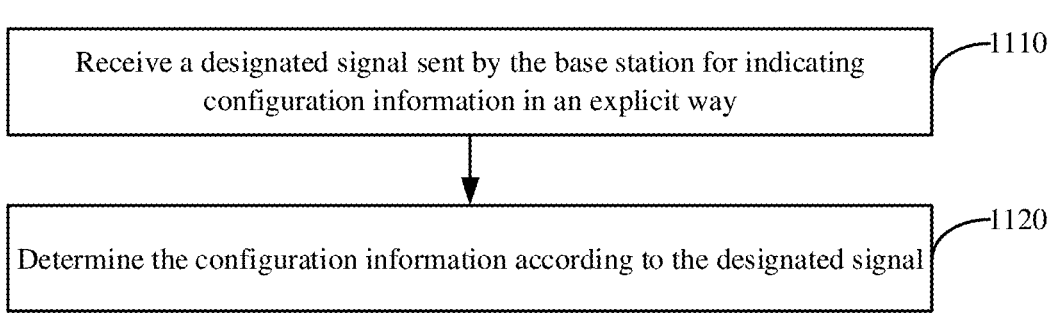
FIG. 11 is a flowchart showing another method for determining an uplink-downlink switching point according to an example.

FIG. 11 is a flowchart of another method for determining an uplink-downlink switching point according to an example. The method for determining an uplink-downlink switching point may be used for a terminal; the method is established based on the method shown in FIG. 7, and when step 710 is performed, as shown in FIG. 11, the step 710 may include the following steps 1110-1120.

In step 1110, a designated signal sent by the base station for indicating configuration information in an explicit way is received.

In an example of the present disclosure, the terminal can directly obtain the configuration information set by the base station for determining the uplink-downlink switching point through the designated signal in an explicit way, and can determine the uplink-downlink switching point according to the obtained configuration information.

In step 1120, the configuration information is determined according to the designated signal.

It can be seen from the above example that, by receiving the designated signal sent by the base station for indicating configuration information in an explicit way and determining the configuration information according to the designated signal, the function of obtaining the configuration information through the designated signal in an explicit way can be achieved, and the reliability of determining the uplink-downlink switching point by the terminal can be improved.

Figure 12:
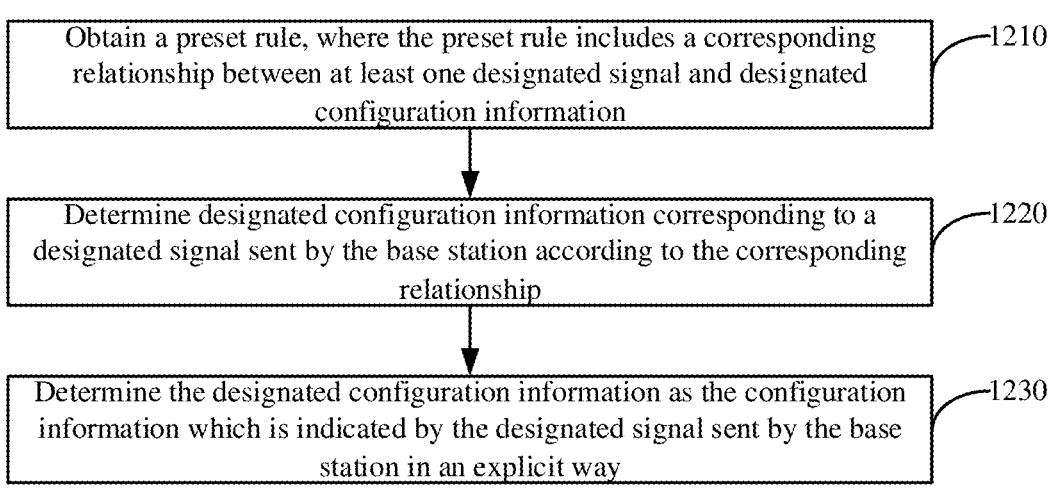
FIG. 12 is a flowchart showing another method for determining an uplink-downlink switching point according to an example.

FIG. 12 is a flowchart of another method for determining an uplink-downlink switching point according to an example. The method for determining an uplink-downlink switching point may be used for a terminal; this method is established based on the method shown in FIG. 11, and when step 1120 is performed, as shown in FIG. 12, the step 1120 may include the following steps 1210-1230.

In step 1210, a preset rule is obtained, where the preset rule includes a corresponding relationship between at least one designated signal and designated configuration information.

In an example, the preset rule is stipulated by a communication protocol, or informed to the terminal by the bases station through designated signaling.

In an example, the designated signaling used by the base station to transmit the preset rule may include at least one of the following: RRC signaling; or MAC-CE signaling; or physical layer signaling.

In step 1220, designated configuration information corresponding to a designated signal sent by the base station is determined according to the corresponding relationship.

In step 1230, the designated configuration information is determined as the configuration information which is indicated by the designated signal sent by the base station in an explicit way.

It can be seen from the above example that, a preset rule may be acquired where the rule includes the corresponding relationship between at least one designated signal and designated configuration information, and according to the corresponding relationship, designated configuration information corresponding to the designated signal sent by the base station may be determined, and the designated configuration information may be determined as the configuration information which is indicated by the designated signal sent by the base station in an explicit way, thereby improving the efficiency of determining the uplink-downlink switching point by the terminal.

Corresponding to the foregoing example of the method for determining an uplink-downlink switching point, the present disclosure also provides an example of a device for determining an uplink-downlink switching point.

Figure 13:
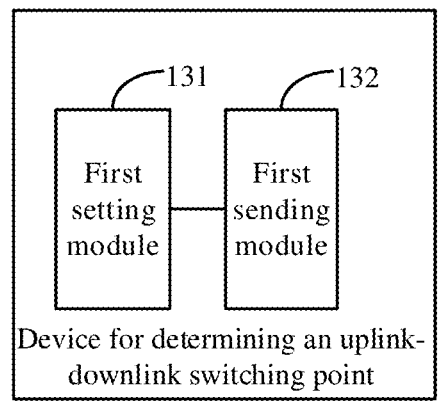
FIG. 13 is a block diagram showing an apparatus for determining an uplink-downlink switching point according to an example.

FIG. 13 is a block diagram showing a device for determining an uplink-downlink switching point according to an example. The device is used in a base station and is used to perform the method for determining an uplink-downlink switching point shown in FIG. 1. As shown in FIG. 13, the device for determining the uplink-downlink switching point may include:

a first setting module 131 configured to set configuration information for instructing a terminal to determine the uplink-downlink switching point; and a first sending module 132 configured to send the configuration information to the terminal, so that the terminal determines the uplink-downlink switching point according to the configuration information.

It can be seen from the above example that, by setting the configuration information for determining the uplink-downlink switching point, and sending the configuration information to the terminal, the terminal can learn about different uplink-downlink switching points through the configuration information, thereby avoiding the terminal from performing invalid detection on an unlicensed carrier, and improving the speed and accuracy of determining the uplink-downlink switching point by the terminal.

In one example, based on the device shown in FIG. 13, the configuration information includes location information of at least one uplink-downlink switching point in an MCOT and/or time length information of an uplink-downlink switching in the MCOT.

Figure 14:
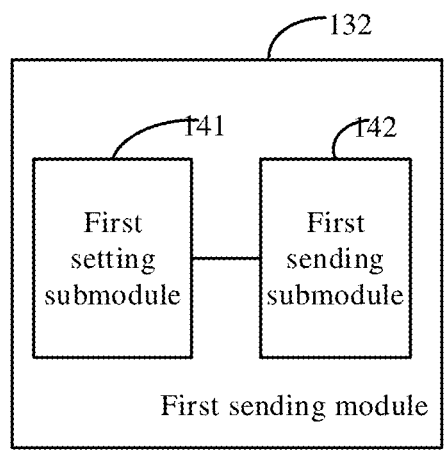
FIG. 14 is a block diagram showing another device for determining an uplink-downlink switching point according to an example.

In one example, based on the device shown in FIG. 13, as shown in FIG. 14, the first sending module 132 may include:

a first setting submodule 141 configured to set transmission unit structural information for indicating the configuration information in an implicit way, where the transmission unit structural information is used to indicate uplink and downlink configuration of a transmission unit included in an MCOT; and a first sending submodule 142 configured to send the transmission unit structural information to the terminal, so that the terminal determines the configuration information according to the transmission unit structural information.

It can be seen from the above example that, by setting the transmission unit structural information for indicating the configuration information in an implicit way, and sending the transmission unit structural information to the terminal, the terminal can determine the configuration information according to the transmission unit structural information, thereby realizing the function of indicating the configuration information through the transmission unit structural information in an implicit way, enriching the implementations of transmitting the configuration information, and improving the reliability of transmitting the configuration information.

In one example, based on the device shown in FIG. 14, the transmission unit structural information includes transmission direction indication information. The transmission direction indication information is used to indicate the transmission direction of a transmission unit included in an MCOT, and includes at least first status information, and/or second status information, and/or third status information;

the first state information is used to indicate that the transmission unit is uplink transmitted, the second state information is used to indicate that the transmission unit is downlink transmitted, and the third state information is used to indicate that the transmission unit is the uplink-downlink switching point.

Figure 15:
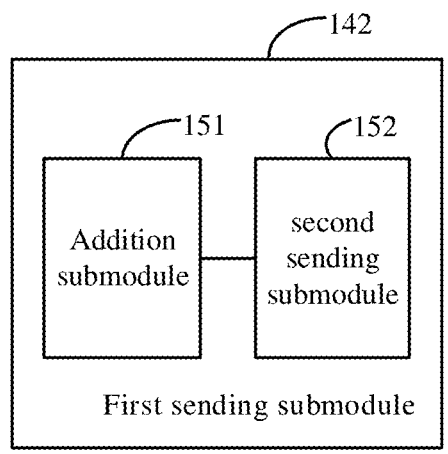
FIG. 15 is a block diagram showing another device for determining an uplink-downlink switching point according to an example.

In one example, based on the device shown in FIG. 14, as shown in FIG. 15, the first sending submodule 142 may include:

an addition submodule 151 configured to add the transmission unit structural information to a designated signaling;

a second sending submodule 152 configured to send the designated signaling to the terminal, so that the terminal obtains the transmission unit structural information from the designated signaling.

Figure 16:
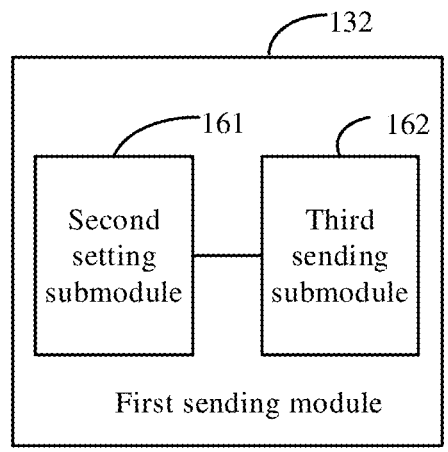
FIG. 16 is a block diagram showing another device for determining an uplink-downlink switching point according to an example.

In one example, based on the device shown in FIG. 13, as shown in FIG. 16, the first sending module 132 may include:

a second setting submodule 161 configured to set a scheduling signaling for indicating the configuration information in an implicit way;

a third sending submodule 162 configured to send the scheduling signaling to the terminal, so that the terminal determines the configuration information according to the scheduling signaling.

It can be seen from the above example that, by setting a scheduling signaling for indicating configuration information in an implicit way and sending the scheduling signaling to the terminal, the terminal can determine the configuration information according to the scheduling signaling, thereby achieving the function of indicating the configuration information through the scheduling signaling in an implicit way, enriching the implementations of transmitting the configuration information, and improving the reliability of transmitting the configuration information.

Figure 17:
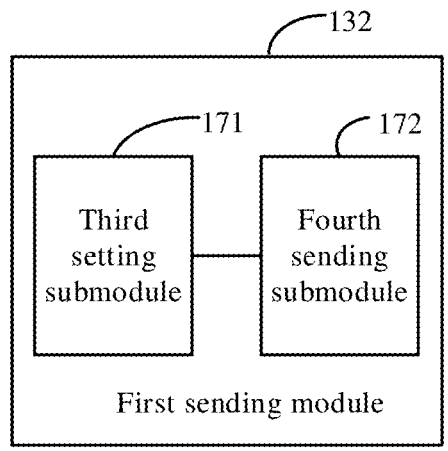
FIG. 17 is a block diagram showing another device for determining an uplink-downlink switching point according to an example.

In one example, based on the device shown in FIG. 13, as shown in FIG. 17, the first sending module 132 may include:

a third setting submodule 171 configured to set a designated signaling for indicating the configuration information in an explicit way; and a fourth sending submodule 172 configured to send the designated signaling to the terminal, so that the terminal determines the configuration information according to the designated signaling.

It can be seen from the above example that, by setting the designated signaling used to indicate the configuration information in an explicit way, and sending the designated signaling to the terminal, the terminal can determine the configuration information according to the designated signaling, thereby realizing the function of indicating the configuration information through the designated signaling in an explicit way, enriching the implementations of transmitting the configuration information, and improving the reliability of transmitting the configuration information.

Figure 18:
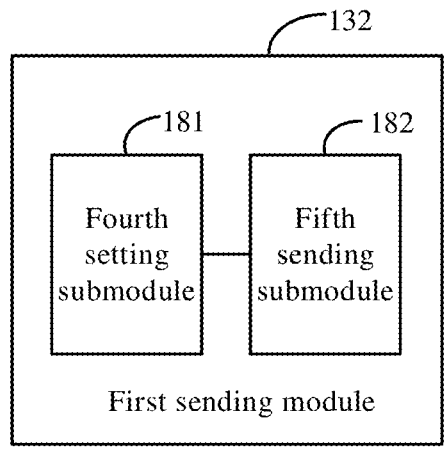
FIG. 18 is a block diagram showing another device for determining an uplink-downlink switching point according to an example.

In one example, based on the device shown in FIG. 13, as shown in FIG. 18, the first sending module 132 may include:

a fourth setting submodule 181 configured to set a designated signal for indicating the configuration information in an explicit way;

a fifth sending submodule 182 configured to send the designated signal to the terminal, so that the terminal determines the configuration information according to the designated signal.

It can be seen from the above example that, by setting the designated signal for indicating the configuration information in an explicit way, and sending the designated signal to the terminal, the terminal can determine the configuration information according to the designated signal, thereby realizing the function of indicating the configuration information through the designated signal in an explicit way, enriching the implementations of transmitting the configuration information, and improving the reliability of transmitting the configuration information.

Figure 19:
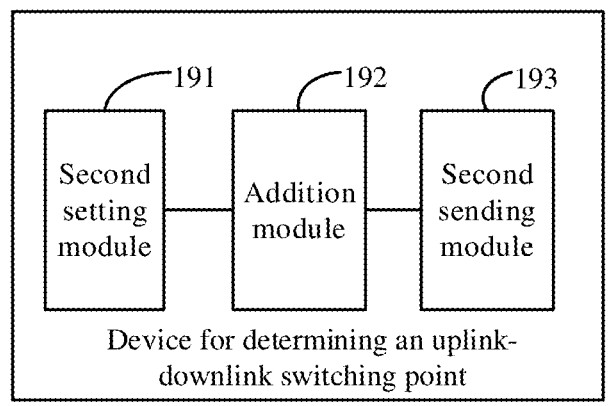
FIG. 19 is a block diagram showing another device for determining an uplink-downlink switching point according to an example.

In one example, based on the device shown in FIG. 18, as shown in FIG. 19, the device may also include:

a second setting module 191 configured to set a corresponding relationship between at least one designated signal and designated configuration information;

an addition module 192 configured to add a preset rule including the corresponding relationship to a designated signaling;

a second sending module 193 configured to send the designated signaling to the terminal, so that the terminal obtains the preset rule including the corresponding relationship from the designated signaling.

In one example, based on the device shown in FIG. 15 or FIG. 17 or FIG. 19, the designated signaling includes at least one of the following: RRC signaling; or MAC-CE signaling; or physical layer signaling.

Figure 20:
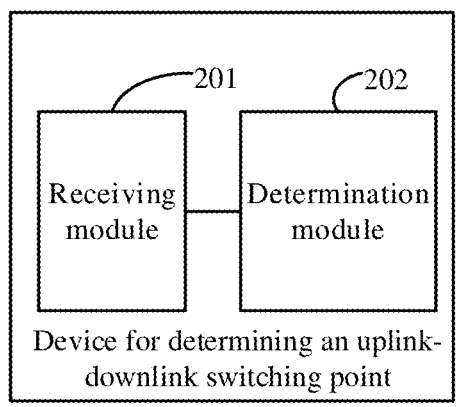
FIG. 20 is a block diagram showing a device for determining an uplink-downlink switching point according to an example.

FIG. 20 is a block diagram showing a device for determining an uplink-downlink switching point according to an example. The device is used in a terminal and is used to execute the method for determining an uplink-downlink switching point shown in FIG. 7. As shown in FIG. 20, the device for determining the uplink-downlink switching point may include:

a receiving module 201 configured to receive configuration information sent by a base station for determining an uplink-downlink switching point;

a determination module 202 configured to determine the uplink-downlink switching point according to the configuration information.

It can be seen from the above example that, by receiving the configuration information sent by the base station for determining the uplink-downlink switching point, and determines the uplink-downlink switching point according to the configuration information, invalid detection of the terminal on the unlicensed carrier can be avoided, and the speed and accuracy of determining the uplink-downlink switching point by the terminal can be improved.

In one example, based on the device shown in FIG. 20, the configuration information includes location information of at least one uplink-downlink switching point in an MCOT and/or time length information of an uplink-downlink switching in the MCOT.

Figure 21:
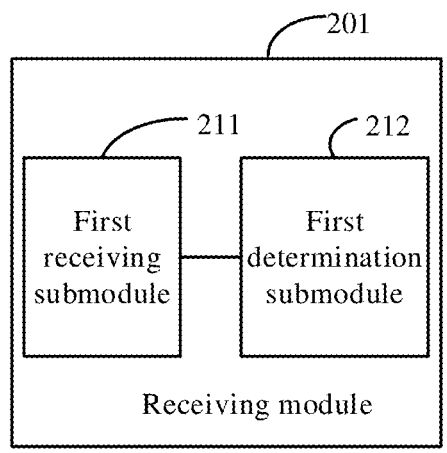
FIG. 21 is a block diagram showing another device for determining an uplink-downlink switching point according to an example.

In one example, based on the device shown in FIG. 20, as shown in FIG. 21, the receiving module 201 may include:

a first receiving submodule 211 configured to receive transmission unit structural information sent by the base station for indicating the configuration information in an implicit way, where the transmission unit structural information is used to indicate uplink and downlink configuration of a transmission unit included in an MCOT;

a first determination submodule 212 configured to determine the configuration information according to the transmission unit structural information.

It can be seen from the above example that, the transmission unit structural information sent by the base station for indicating the configuration information in an implicit way can be received, where the transmission unit structural information is used to indicate the uplink and downlink configuration of the transmission unit in an MCOT, and the configuration information can be determined according to the transmission unit structural information. In such a way, the function of obtaining the configuration information through the transmission unit structural information in an implicit way can be achieved, and the reliability of determining the uplink-downlink switching point by the terminal can be improved.

Figure 22:
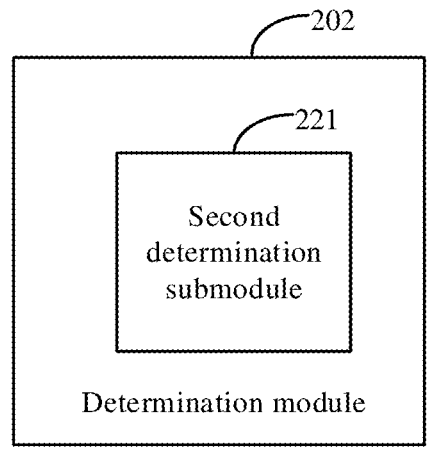
FIG. 22 is a block diagram showing another device for determining an uplink-downlink switching point according to an example.

In one example, based on the device shown in FIG. 21, the transmission unit structural information includes transmission direction indication information. The transmission direction indication information is used to indicate the transmission direction of a transmission unit included in an MCOT, and includes at least first status information, and/or second status information, and/or third state information; the first state information is used to indicate that the transmission unit is uplink transmitted, the second state information is used to indicate that the transmission unit is downlink transmitted, and the third state information is used to indicate that the transmission unit is the uplink-downlink switching point; as shown in FIG. 22, the determination module 202 may include:

a second determination submodule 221 configured to determine the uplink-downlink switching point according to the third state information included in the transmission direction indication information.

Figure 23:
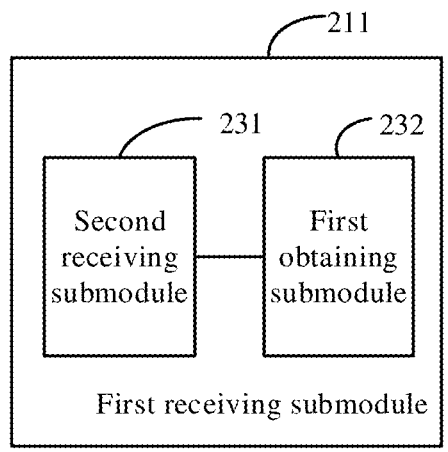
FIG. 23 is a block diagram showing another device for determining an uplink-downlink switching point according to an example.

In one example, based on the device shown in FIG. 21, as shown in FIG. 23, the first receiving submodule 211 may include:

a second receiving submodule 231 configured to receive a designated signaling sent by the base station, where the designated signaling includes the transmission unit structural information;

a first obtaining submodule 232 configured to obtain the transmission unit structural information from the designated signaling.

Figure 24:
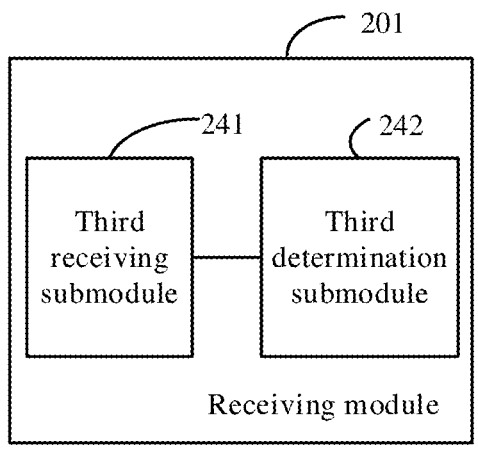
FIG. 24 is a block diagram showing another device for determining an uplink-downlink switching point according to an example.

In one example, based on the device shown in FIG. 20, as shown in FIG. 24, the receiving module 201 may include:

a third receiving submodule 241 configured to receive a scheduling signaling sent by the base station for indicating the configuration information in an implicit way;

a third determination submodule 242 configured to determine the configuration information according to the scheduling signaling.

It can be seen from the above example that, by receiving the scheduling signaling sent by the base station for indicating the configuration information in an implicit way, and determining the configuration information according to the scheduling signaling, the function of obtaining configuration information through the scheduling signaling in an implicit way can be achieved, and the reliability of determining the uplink-downlink switching points by the terminal can be improved.

Figure 25:
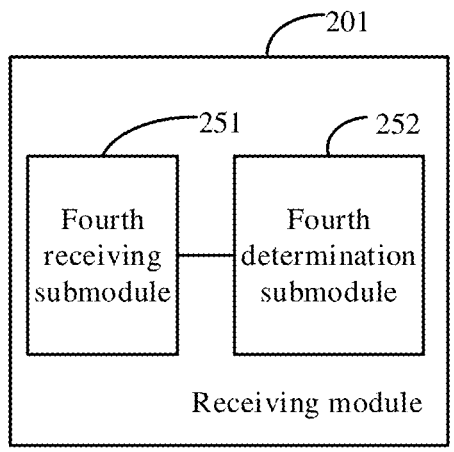
FIG. 25 is a block diagram showing another device for determining an uplink-downlink switching point according to an example.

In one example, based on the device shown in FIG. 20, as shown in FIG. 25, the receiving module 201 may include:

a fourth receiving submodule 251 configured to receive a designated signaling sent by the base station for indicating the configuration information in an explicit way;

a fourth determination submodule 252 configured to determine the configuration information according to the designated signaling.

It can be seen from the above example that, by receiving the designated signaling sent by the base station for indicating the configuration information in an explicit way, and determining the configuration information according to the designated signaling, the function of obtaining the configuration information through the designated signaling in an explicit way can be achieved, and the reliability of determining the uplink-downlink switching point by the terminal can be improved.

Figure 26:
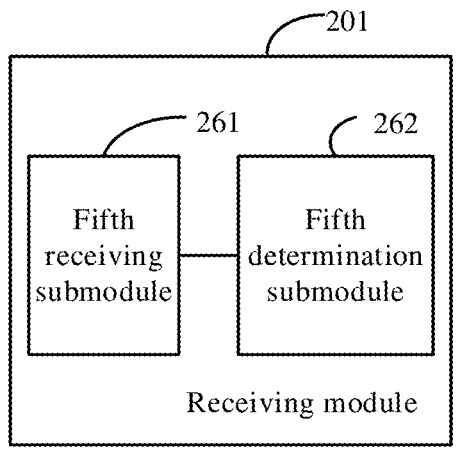
FIG. 26 is a block diagram showing another device for determining an uplink-downlink switching point according to an example.

In one example, based on the device shown in FIG. 20, as shown in FIG. 26, the receiving module 201 may include:

a fifth receiving submodule 261 configured to receive a designated signal sent by the base station for indicating the configuration information in an explicit way;

a fifth determination submodule 262 configured to determine the configuration information according to the designated signal.

It can be seen from the above example that, by receiving the designated signal sent by the base station for indicating configuration information in an explicit way and determining the configuration information according to the designated signal, the function of obtaining the configuration information through the designated signal in an explicit way can be achieved, and the reliability of determining the uplink-downlink switching point by the terminal can be improved.

Figure 27:
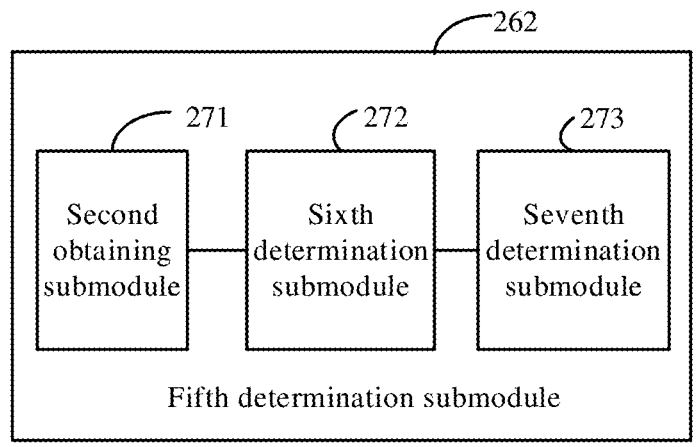
FIG. 27 is a block diagram showing another device for determining an uplink-downlink switching point according to an example.

In one example, based on the device shown in FIG. 26, as shown in FIG. 27, the fifth determination submodule 262 may include:

a second obtaining submodule 271 configured to obtain a preset rule which includes a corresponding relationship between at least one designated signal and designated configuration information;

a sixth determination submodule 272 configured to determine designated configuration information corresponding to the designated signal sent by the base station according to the corresponding relationship;

a seventh determination submodule 273 configured to determine the designated configuration information as the configuration information which is indicated by the designated signal in an explicit way.

It can be seen from the above example that, a preset rule may be acquired where the rule includes the corresponding relationship between at least one designated signal and designated configuration information, and according to the corresponding relationship, designated configuration information corresponding to the designated signal sent by the base station may be determined, and the designated configuration information may be determined as the configuration information which is indicated by the designated signal sent by the base station in an explicit way, thereby improving the efficiency of determining the uplink-downlink switching point by the terminal.

In one example, based on the device shown in FIG. 27, the preset rule is stipulated by the communication protocol, or notified to the terminal by the base station through the designated signaling.

In one example, based on the device shown in FIG. 23, FIG. 25, or FIG. 27, the designated signaling includes at least one of the following: RRC signaling; or MAC-CE signaling; or physical layer signaling.

As for the device example, since it basically corresponds to the method example, the relevant part can refer to the part of the description of the method example. The device examples described above are merely illustrative. The units described above as separate components may or may not be physically separated, and the components displayed as units may or may not be physical units, that is, they may be located in one unit, or can be distributed to multiple network units. Some or all of the modules can be selected according to actual needs to achieve the objectives of the solutions of the present disclosure. Those of ordinary skill in the art can understand and implement it without creative work.

The present disclosure also provides a non-transitory computer-readable storage medium with a computer program stored thereon, and the computer program is used to execute the method for determining an uplink-downlink switching point described in any one of FIGS. 1 to 6 above.

The present disclosure also provides a non-transitory computer-readable storage medium with a computer program stored thereon, and the computer program is used to execute the method for determining an uplink-downlink switching point described in any one of FIGS. 7 to 12 above.

The present disclosure also provides a device for determining an uplink-downlink switching point, and the device is used in a base station, and the device includes:

a processor; and a memory for storing processor-executable instructions;

where the processor is configured to:

set configuration information for determining the uplink-downlink switching point; and send the configuration information to the terminal, so that the terminal determines the uplink-downlink switching point according to the configuration information.

Figure 28:
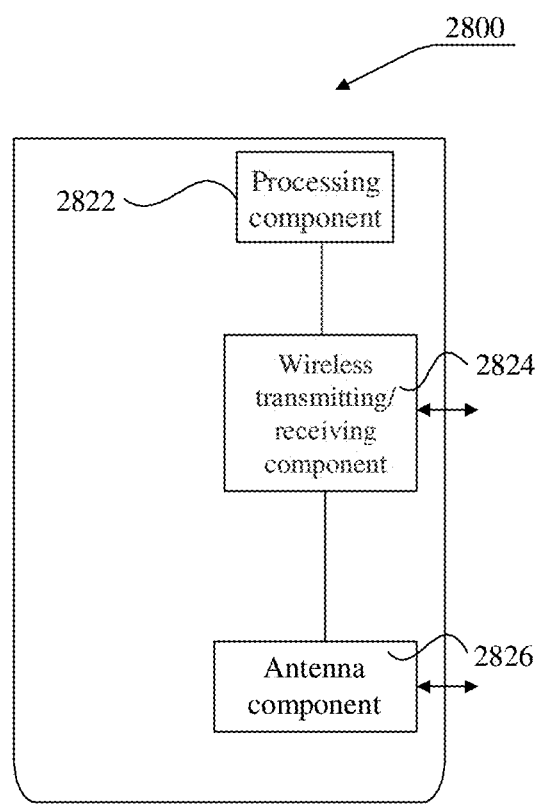
FIG. 28 is a schematic structural diagram showing a device for determining an uplink-downlink switching point according to an example.

As shown in FIG. 28, FIG. 28 is a schematic structural diagram of an apparatus for determining an uplink-downlink switching point according to an example. The apparatus 2800 may be provided as a base station. Refer to FIG. 28, the device 2800 includes a processing component 2822, a wireless transmitting/receiving component 2824, an antenna component 2826, and a signal processing part specific to a wireless interface. The processing component 2822 may further include one or more processors.

One of the processors in the processing component 2822 may be configured to execute any one of the foregoing methods for determining an uplink-downlink switching point.

The present disclosure also provides a device for determining an uplink-downlink switching point, the device is used in a terminal, and the device includes:

a processor;

a memory for storing processor-executable instructions;

where the processor is configured to:

receive configuration information sent by a base station for instructing the terminal to determine the uplink-downlink switching point;

determine the uplink-downlink switching point according to the configuration information.

Figure 29:
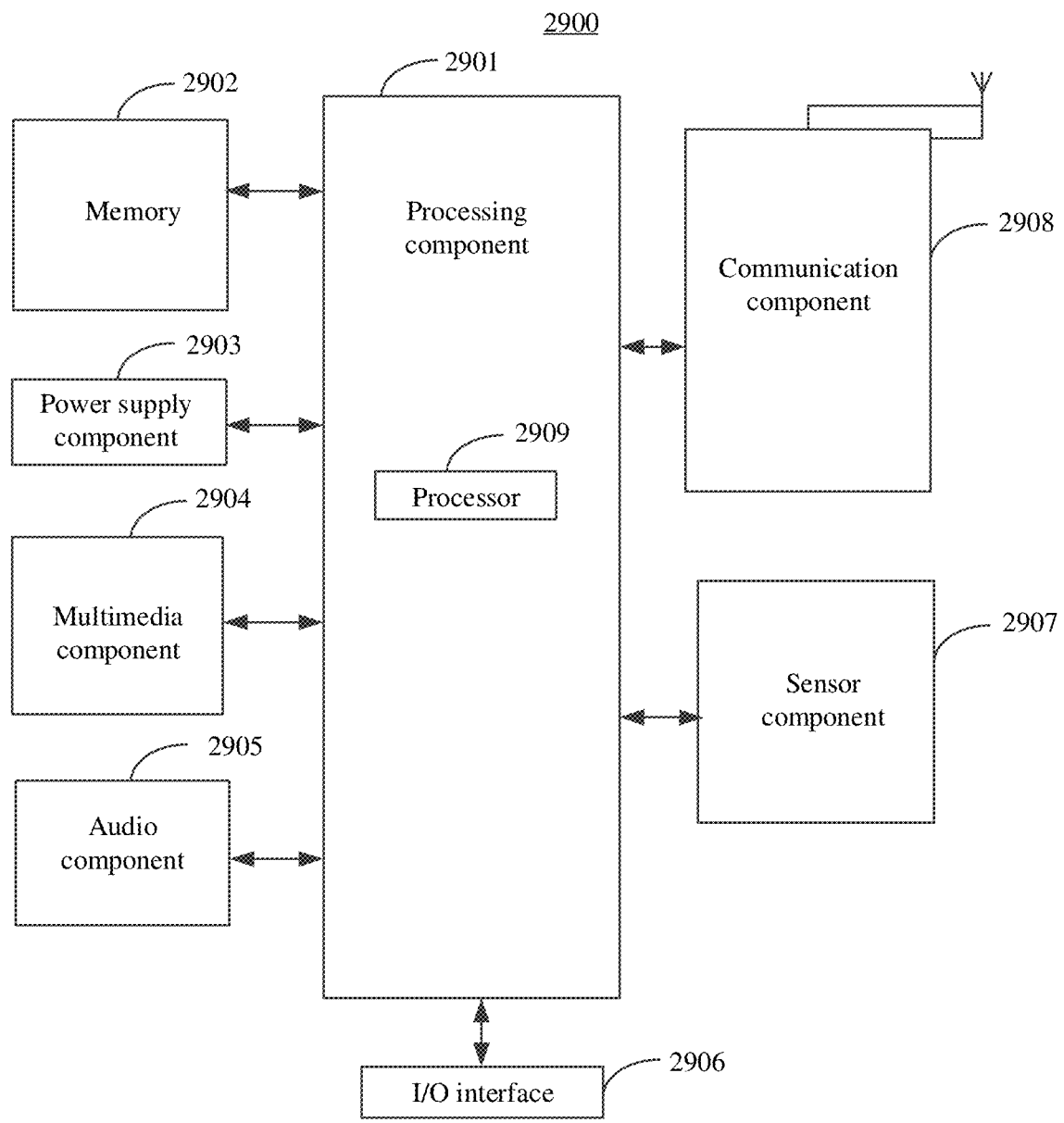
FIG. 29 is a schematic structural diagram showing a device for determining an uplink-downlink switching point according to an example.

FIG. 29 is a schematic structural diagram showing a device for determining an uplink-downlink switching point according to an example. As shown in FIG. 29, a device 2900 for determining an uplink-downlink switching point is shown according to an example. The device 2900 may be a computer, a mobile phone, a digital broadcasting terminal, a messaging device, a game console, a tablet device, medical equipment, fitness equipment, personal digital assistants and other terminals.

Refer to FIG. 29, the device 2900 may include one or more of the following components: a processing component 2901, a memory 2902, a power supply component 2903, a multimedia component 2904, an audio component 2905, an input/output (I/O) interface 2906, a sensor component 2907, and the communication component 2908.

The processing component 2901 generally controls the overall operations of the device 2900, such as operations associated with display, telephone calls, data communications, camera operations, and recording operations. The processing component 2901 may include one or more processors 2909 to execute instructions to complete all or part of the steps of the foregoing method. In addition, the processing component 2901 may include one or more modules to facilitate the interaction between the processing component 2901 and other components. For example, the processing component 2901 may include a multimedia module to facilitate the interaction between the multimedia component 2904 and the processing component 2901.

The memory 2902 is configured to store various types of data to support the operation of the device 2900. Examples of these data include instructions for any application or method operating on the device 2900, contact data, phone book data, messages, pictures, videos, and so on. The memory 2902 can be implemented by any type of volatile or non-volatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply component 2903 provides power for various components of the device 2900. The power supply component 2903 may include a power management system, one or more power supplies, and other components associated with generating, managing, and distributing power for the device 2900.

The multimedia component 2904 includes a screen that provides an output interface between the device 2900 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some examples, the multimedia component 2904 includes a front camera and/or a rear camera. When the device 2900 is in an operation mode, such as a shooting mode or a video mode, the front camera and/or the rear camera can receive external multimedia data. Each front camera and rear camera can be a fixed optical lens system or have focal length and optical zoom capabilities.

The audio component 2905 is configured to output and/or input audio signals. For example, the audio component 2905 includes a microphone (MIC), and when the device 2900 is in an operation mode, such as a call mode, a recording mode, and a voice recognition mode, the microphone is configured to receive external audio signals. The received audio signal may be further stored in the memory 2902 or transmitted via the communication component 2908. In some examples, the audio component 2905 further includes a speaker for outputting audio signals.

The I/O interface 2906 provides an interface between the processing component 2901 and the peripheral interface module. The peripheral interface module may be a keyboard, a click wheel, a button, etc. These buttons may include but are not limited to: home button, volume button, start button, and lock button.

The sensor component 2907 includes one or more sensors for providing the device 2900 with various aspects of state evaluation. For example, the sensor component 2907 can detect the open/close state of the device 2900 and the relative positioning of the components. For example, the component is the display and the keypad of the device 2900. The sensor component 2907 can also detect the position change of the device 2900 or a component of the device 2900, the presence or absence of contact between the user and the device 2900, the orientation or acceleration/deceleration of the device 2900, and the temperature change of the device 2900. The sensor component 2907 may include a proximity sensor configured to detect the presence of nearby objects when there is no physical contact. The sensor component 2907 may also include a light sensor, such as a CMOS or CCD image sensor, for use in imaging applications. In some examples, the sensor component 2907 may also include an acceleration sensor, a gyroscope sensor, a magnetic sensor, a pressure sensor or a temperature sensor.

The communication component 2908 is configured to facilitate wired or wireless communication between the device 2900 and other devices. The device 2900 can access a wireless network based on a communication standard, such as WiFi, 2G or 3G, or a combination thereof. In an example, the communication component 2908 receives a broadcast signal or broadcast related information from an external broadcast management system via a broadcast channel. In an example, the communication component 2908 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example, the apparatus 2900 may be implemented by one or more application specific integrated circuits (ASIC), digital signal processors (DSP), digital signal processing equipment (DSPD), programmable logic devices (PLD), field programmable gate array (FPGA), controller, microcontroller, microprocessor, or other electronic components, for performing the above-mentioned methods.

In an example, there is also provided a non-transitory computer-readable storage medium, such as a memory 2902 including instructions, which may be executed by the processor 2909 of the device 2900 to complete the foregoing method. For example, the non-transitory computer-readable storage medium may include ROM, random access memory (RAM), CD-ROM, magnetic tape, floppy disk, optical data storage device, etc.

When the instructions in the storage medium are executed by the processor, the device 2900 is enabled to execute any one of the above-mentioned methods for determining an uplink-downlink switching point.

After considering the specification and practicing the disclosure disclosed herein, those skilled in the art will easily think of other examples of the present disclosure. This application is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the examples are to be regarded as illustrative only, and the true scope and spirit of the present disclosure are pointed out by the following claims.

It should be understood that the present disclosure is not limited to the precise structure that has been described above and shown in the drawings, and various modifications and changes can be made without departing from its scope. The scope of the present disclosure is only limited by the appended claims.

The invention claimed is:

1. A method for determining an uplink-downlink switching point, applied to a base station, and comprising:
    setting configuration information for determining the uplink-downlink switching point; and
    sending the configuration information to a terminal, so that the terminal determines the uplink-downlink switching point according to the configuration information,
    wherein sending the configuration information to the terminal comprises:
    setting a designated signaling for indicating the configuration information in an explicit way, wherein the designated signaling comprises location information of at least one uplink-downlink switching point in a maximum channel occupation time (MCOT), and the location information comprises an offset value of each of the at least one uplink-downlink switching point relative to a designated reference point; and sending the designated signaling to the terminal, so that the terminal determines the configuration information according to the designated signaling; or
    setting a designated signal for indicating the configuration information in an explicit way; and sending the designated signal to the terminal, so that the terminal determines the configuration information according to the designated signal, based on a preset rule that is defined by the base station and informed to the terminal.

2. The method according to claim 1, wherein the configuration information includes time length information of an uplink-downlink switching in the MCOT.

3. The method according to claim 1, wherein in response to setting the designated signal for indicating the configuration information in the explicit way, the method further comprises:

setting a corresponding relationship between at least one designated signal and designated configuration information;

adding the preset rule including the corresponding relationship to the designated signaling; and sending the designated signaling to the terminal, so that the terminal obtains the preset rule including the corresponding relationship from the designated signaling.

4. A method for determining an uplink-downlink switching point, applied to a terminal, and comprising:

receiving configuration information sent by a base station for determining the uplink-downlink switching point; and determining the uplink-downlink switching point according to the configuration information, wherein receiving the configuration information sent by the base station for determining the uplink-downlink switching point comprises:

receiving a designated signaling sent by the base station for indicating the configuration information in an explicit way, wherein the designated signaling comprises location information of at least one uplink-downlink switching point in a maximum channel occupation time (MCOT), and the location information comprises an offset value of each of the at least one uplink-downlink switching point relative to a designated reference point; and determining the configuration information according to the designated signaling; or receiving a designated signal sent by the base station for indicating the configuration information in an explicit way; and determining the configuration information according to the designated signal, based on a preset rule that is defined by the base station and notified to the terminal.

5. The method according to claim 4, wherein the configuration information includes time length information of an uplink-downlink switching in the MCOT.

6. The method according to claim 4, wherein determining the configuration information according to the designated signal, based on the preset rule that is defined by the base station and informed to the terminal comprises:

obtaining the preset rule which includes a corresponding relationship between at least one designated signal and designated configuration information;

determining designated configuration information corresponding to the designated signal sent by the base station according to the corresponding relationship; and determining the designated configuration information as the configuration information which is indicated by the designated signal in an explicit way, wherein the preset rule is specified by a communication protocol, or informed to the terminal by the base station through a designated signaling.

7. The method according to claim 4, wherein the designated signaling includes at least one of:

radio resource control (RRC) signaling;

media access control-control element (MAC-CE) signaling; or physical layer signaling.

8. A device for determining an uplink-downlink switching point, applied to a terminal, and comprising:

a processor; and a memory for storing processor-executable instructions;

wherein the processor is configured to:

receive configuration information sent by a base station for instructing the terminal to determine the uplink-downlink switching point; and determine the uplink-downlink switching point according to the configuration information, wherein when receiving the configuration information sent by the base station for determining the uplink-downlink switching point, the processor is further configured to:

receive a designated signaling sent by the base station for indicating the configuration information in an explicit way, wherein the designated signaling comprises location information of at least one uplink-downlink switching point in a maximum channel occupation time (MCOT), and the location information comprises an offset value of each of the at least one uplink-downlink switching point relative to a designated reference point; and determine the configuration information according to the designated signaling; or receive a designated signal sent by the base station for indicating the configuration information in an explicit way; and determine the configuration information according to the designated signal, based on a preset rule that is defined by the base station and notified to the terminal.

* * * * *